Patented Apr. 23, 1929.

1,709,986

UNITED STATES PATENT OFFICE.

GEORG KRÄNZLEIN AND MARTIN CORELL, OF HOCHST-ON-THE-MAIN, GERMANY, ASSIGNORS TO GRASSELLI DYESTUFF CORPORATION, OF NEW YORK, N. Y., A CORPORATION OF DELAWARE.

DIHYDRO-P-THIOAZINES OF THE ANTHRAQUINONE SERIES AND PROCESS OF MAKING SAME.

No Drawing. Application filed December 15, 1926, Serial No. 155,100, and in Germany December 17, 1925.

The present invention relates to the preparation of dihydro-p-thioazines of the anthraquinone series.

In our copending U. S. patent application Ser. 155,099, of even date, we have described reaction-products obtainable by subjecting ortho-amino-anthraquinone-mercaptans or the alkali salts thereof to reaction with bodies of the following type:

Hlg. $CH_2.CH_2x$ wherein Hlg stands for a halogen-atom and x represents a halogen or the hydroxyl group. The ortho-aminoanthraquinone omega-halogenethylthioethers and the orthoaminoanthraquinone omega-hydroxy thioether thus obtained are capable of being converted into new compounds, which may be regarded as dihydro-p-thioazines of the anthraquinone series. In general compounds of the following formula:

$$A\langle\begin{matrix}NH_2\\ S.CH_2.CH_2.x\end{matrix}$$

wherein A represents an anthraquinone residue which may be substituted and x represents halogen or the OH-group, the two substituents standing in ortho-position to each other and in α- and β-position in the anthraquinone nucleus, are capable of being converted into the new dihydro-p-thioazines of the anthraquinone series. The simplest representative of this type of bodies namely the anthraquinone-1.2-dihydro-p-thioazine is formed according to the following scheme:

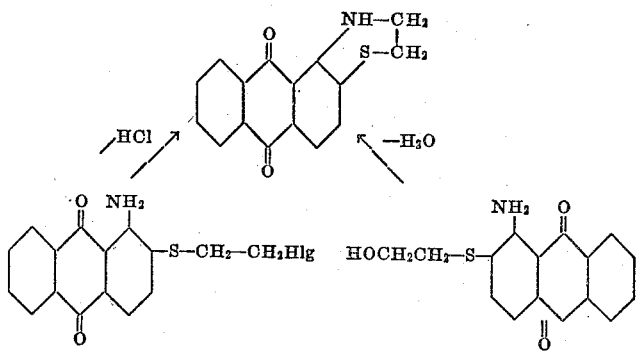

The new ring-structures can be produced from the ortho-aminoanthraquinone-omega-halogen-thioethers by heating them alone or in high boiling solvents and from the orthoaminoanthraquinone-omega-hydroxy-thioether by heating them in presence of an acid condensing agent, for instance oleum of 10 per cent strength, to about 80° C. The new condensation products may easily be sulfonated and then yield valuable acid dyestuffs.

The following examples serve to illustrate our invention, but they are not intended to limit it thereto:

(1) 1-amino-anthraquinone-2-(omega-bromo)-ethylthioether M. P. 145–147° C. of the following formula:

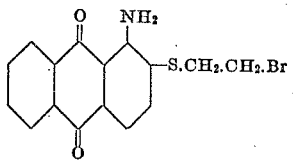

is heated to boiling in trichlorobenzene with a small quantity of copper added. As soon as the color of the solution has changed from red to violet-red, the trichlorobenzene is distilled off with steam and the residue is recrystallized from methly-alcohol and chloroform. The anthraquinone-1.2-dihydro-p-thioazine thus obtained melts at 168–170° C. and has most probably the following constitution:

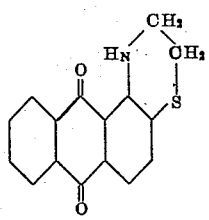

It dissolves in concentrated sulfuric acid to a reddish-violet solution.

(2) 20 parts by weight of 1-amino-4-p-tolylamino - anthraquinone - 2 - (omega - bromo)-ethylthioether of the following formula:

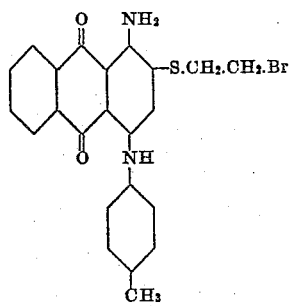

are heated with 200 parts of trichloro-benzene, 4 parts of dehydrated soduim acetate and 2 parts of copper powder until the pure blue color of the solution has turned bluish-green. After cooling, the new base, which now presumably contains the dihydro-p-thioazine ring and has probably the following constitution:

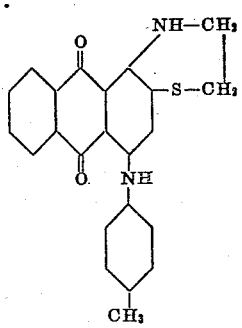

is isolated.

(3) Ortho - aminoanthraquinone omega-hydroxy-thioether of the following formula:

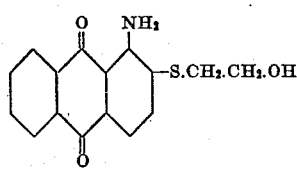

is heated to about 70–100° C. in 5–10 times the quantity of oleum of 10% strength until the color of the solution has changed from red to a pure blue. After having poured the solution in water and washed it until neutral a bluish-red paste is obtained which dyes acetate silk red tints of excellent fastness. In a dry state, this body is identical with that obtained according to Example (1).

When the ring of the 1.4-diaminoanthraquinone-2-chlor-3 - omega - hydroxythioether of the formula:

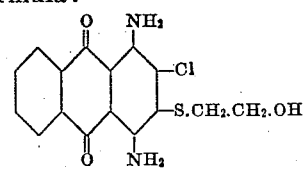

is closed there is obtained a blue dyestuff and, when the ring of the 1.5-diaminoanthraquinone-ortho-diomega-hydroxy-thioether of the formula:

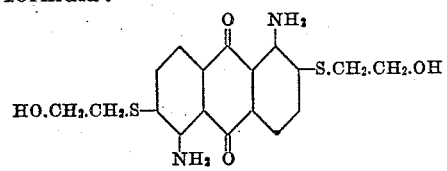

is closed, a bordeaux-red dystuff.

Instead of the oleum there may also be used sulfuric acid at an elevated temperature, or zinc chloride as a means for closing the ring or as an acid medium.

(4) 50 parts of dihydro-p-thioazine of the formula:

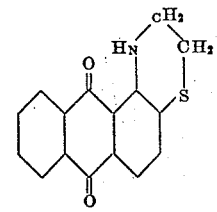

obtainable from ortho-amino-anthraquinone-omega-hydroxy-ethylthioether are heated to 130–140° C. with 250 parts of sulfuric acid of 66° Bé. and 250 parts of oleum of 30% strength until the product has become soluble in water. After having poured the mixture in water and filtered, it is washed with common salt until neutral and dried. The new dyestuff dyes wool in an acid bath deep reddish-brown tints. It has the probable formula:

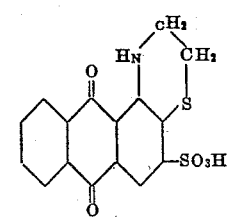

(5) 1 - amino - 4 - p-tolylamino-anthraquinone-2-(omega-hydroxy)-thioether of the following formula:

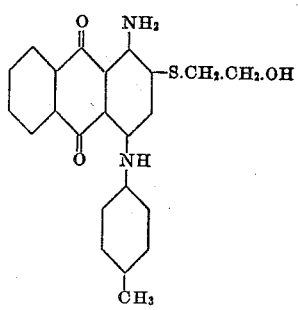

are dissolved in 5–10 times the quantity of oleum of 20% strength and this solution is heated to 80–90° C. until it has become soluble in water. During this operation the color of the solution, which is at first violet, turns greyish-blue. Evidently sulfonation takes place simultanenously with the closing of the ring. It has the probable formula

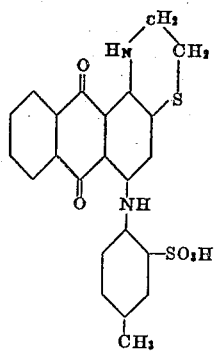

The dyestuff thus obtained, after being isolated in the usual manner, dyes wool in an acid bath green tints.

We claim:

1. A process which comprises heating to a temperature between 70° C. and 220° C. in the presence of a diluent and a condensing agent a compound of the following formula:

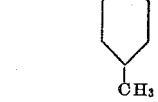

wherein A represents an anthraquinone residue which may be substituted and x halogen or the OH-group, the two substituents standing in ortho-position to each other and in α- and β-position in the anthraquinone nucleus.

2. A process which comprises heating to a temperature between 70° C. and 220° C. in the presence of a diluent and a condensing agent a compound of the following formula:

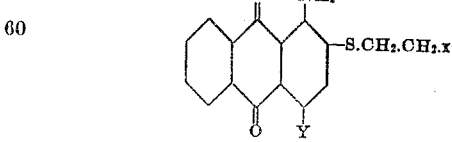

wherein x stands for halogen or the OH- group and Y stands for hydrogen or the -NH.aryl-CH₃ group.

3. A process which comprises heating to a temperature between 70° C. and 150° C. in the presence of an excess of concentrated sulfuric acid, until the mass has become soluble in water, a compound of the following formula:

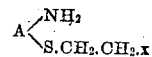

wherein A represents an anthraquinone residue which may be substituted and x halogen or the OH-group, the two substituents standing in ortho-position to each other and in α- and β-position in the anthraquinone nucleus.

4. A process which comprises heating to a temperature between 70° C. and 150° C. in the presence of an excess of concentrated sulfuric acid, until the mass has become soluble in water a compound of the following formula:

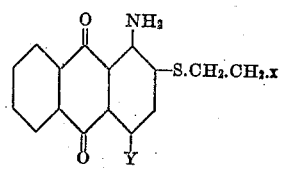

wherein x stands for halogen or the OH-group and Y stands for hydrogen or the -NH.aryl-CH₃ group.

5. A process which comprises heating to a temperature between 80° C. and 90° C. in the presence of an excess of oleum of 20% strength until the mass has become soluble in water a compound of the following formula:

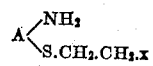

wherein A represents an anthraquinone residue which may be substituted and x halogen or the OH-group, the two substituents standing in ortho-position to each other and in α- and β-position in the anthraquinone nucleus.

6. A process which comprises heating to a temperature between 80° C. and 90° C. in the presence of an excess of oleum of 20% strength, until the mass has become soluble in water a compound of the following formula:

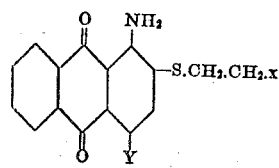

wherein x stands for halogen or the OH-group and Y stands for hydrogen or the -NH.aryl-CH₃ group.

7. As new products, compounds of the following formula:

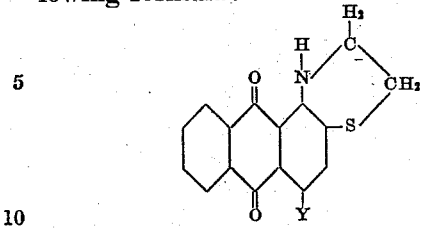

wherein Y stands for hydrogen or the -NH.aryl-CH₃ group, said compounds being suitable dyestuffs for dyeing acetate silk.

8. As new products, compounds of the following formula:

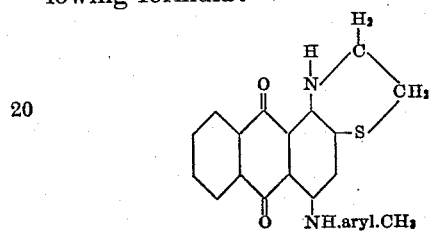

said compounds being soluble in concentrated sulfuric acid with a blue color and dyeing acetate silk green tints.

9. As a new product the compound of the following formula:

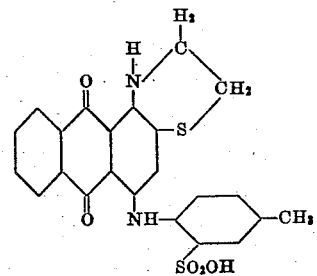

said compound being a duestuff soluble in water and dyeing wool in an acid bath green tints.

In testimony whereof we affix our signatures.

GEORG KRÄNZLEIN.
MARTIN CORELL.